United States Patent [19]

Bayer et al.

[11] 3,913,571

[45] Oct. 21, 1975

[54] PLASTER CASTS

[75] Inventors: Gerhard Bayer, Ludwigshafen-Rheingönheim; Manfred Haerter, Neuhofen; Egon Cherdron; Fritz Fässle, both of Limburgerhof; Ernst Urmann, Ludwigshafen-Mundenheim, all of Germany; Hermann Rüter, deceased, late of Ludwigshafen (Rhine), Germany; by Elisabeth Rüter, heiress; Edla Rüter, heiress, both of Ludwigshafen (Rhine), Germany

[73] Assignee: Gebr. Giulini GmbH, Ludwigshafen (Rhine), Germany

[22] Filed: Feb. 25, 1974

[21] Appl. No.: 445,145

Related U.S. Application Data

[63] Continuation-in-part of Ser. No. 789,971, Jan. 8, 1969, abandoned.

[30] Foreign Application Priority Data

Jan. 11, 1968 Germany............................ 1616146

[52] U.S. Cl. .................... 128/91; 106/111; 106/110
[51] Int. Cl............................................. C04b 11/00
[58] Field of Search............ 106/110, 111; 128/91 R

[56] References Cited

UNITED STATES PATENTS

| | | | |
|---|---|---|---|
| 3,305,375 | 2/1967 | Jakacki.............................. | 106/110 |
| 3,316,901 | 5/1967 | Smith................................. | 106/111 |
| 3,328,121 | 6/1967 | Shull.................................. | 106/110 |
| 3,337,298 | 8/1967 | Ruter et al......................... | 106/110 |
| 3,574,648 | 4/1971 | Wirsching et al.................. | 106/110 |

*Primary Examiner*—J. Poer
*Attorney, Agent, or Firm*—Spencer & Kaye

[57] ABSTRACT

Bandages coated and/or impregnated with plaster of Paris provide materially stronger plaster casts when the plaster of Paris is the hydrothermally produced alpha form of calcium sulfate hemihydrate and is ground to an average grain size of less than 7 microns ($\mu$).

14 Claims, No Drawings

PLASTER CASTS

CROSS REFERENCE TO RELATED APPLICATION

This application is a continuation-in-part of our co-pending application Ser. No. 789,971, filed January 8, 1969, now abandoned.

BACKGROUND OF THE INVENTION

When applying plaster casts, the medical profession employs gauze bandages coated and/or impregnated with plaster of Paris. These plaster bandages have been produced by sprinkling pulverized calcium sulfate hemihydrate loosely onto a gauze bandage while the latter is being wound. Another method involves spreading a mixture of calcium sulfate hemihydrate, binder, organic solvent and, possibly, further additives onto a gauze bandage in a thin layer; the solvent is subsequently removed from this co-called coated bandage by means of drying, and the calcium sulfate hemihydrate is firmly anchored on the gauze bandage by the binder before the bandage is wound.

The calcium sulfate hemihydrate usually employed is a very pure dry burnt alabaster which possesses a short setting time of from 3 to 5 minutes and, furthermore, a high degree of whiteness. Alabaster which contains the beta calcium sulfate hemihydrate is produced from selected gypsum rock qualities by drying burning and results, after setting, in plaster with a relatively high mechanical hardness. In order to minimize plaster cast weight, hard plasters of alpha calcium sulfate hemihydrate were proposed for coated bandages. The hard plasters are produced, e.g., by steam-treating natural gypsum rock chunks (U.S. Pat. No. 1,901,051) in autoclaves. They possess higher mechanical strength and a lower water requirement than beta-calcium sulphate hemihydrate. These plasters, however, unlike dry burnt alabaster, have not thus far found acceptance in practice for the production of plaster of Paris bandages since they possess the disagreeable characteristic of producing a watery film on their surface during setting. Moreover, the strength characteristics in the resulting plaster casts are inexplicably hardly greater than the corresponding values obtained with alabaster.

SUMMARY OF THE INVENTION

The present invention makes it possible to use alpha-calcium sulphate hemihydrate to produce plaster bandages for medicinal purposes without the above-noted drawbacks. Moreover, an enormous increase in the strength characteristics of the resulting plaster cast is obtained when the alpha calcium sulfate hemihydrate is produced by a hydrothermal recrystallization process, for example as disclosed in German Published Patent application No. 1,157,128 corresponding to U.S. Pat. No. 3,337,298, and when the resulting alpha calcium sulfate hemihydrate crystals are reduced, by extremely fine grinding in a grinding apparatus, to an average grain size of less than 7 microns, but at least about 0.5 [as determined by D.I.N. 1168 (German Industrial Norm)] which is below the average grain size which produces optimum, that is, maximum strength values in a pure plaster body cast from the hydrothermally produced hemihydrate.

The maximum hardness characteristics of pure plaster bodies made from the alpha calcium sulfate hemihydrate (determined by D.I.N. 1168) vary between an average grain size of from 7 to 11$\mu$. In accordance with the present invention, maximum hardness characteristics of plaster casts, that is, casts made from a bandage material and plaster, is obtained when the hydrothermally produced alpha calcium sulfate hemihydrate has an average grain size less than 7$\mu$. The increase in plaster cast strength characteristics obtained by using an average grain size of less than 7$\mu$ also results in good processing characteristics.

A further unexpected advantage of the present invention is that the appearance of watery films is avoided during setting when the average grain size of the hydrothermally produced alpha calcium sulfate hemihydrate employed is below 7$\mu$, preferably below 5$\mu$ (determined according to Kozeny-Carman in a Fisher sub-sieve-sizer).

Ground plasters, e.g., beta hemihydrate of natural gypsum or alpha hemihydrate produced by treatment with steam in an autoclave (i.e., not hydrothermally via solution) normally used for plaster cast bandages have an average grain size of more than 7$\mu$. A further comminution of these plasters does not result in any further increase in hardness either in the pure plaster body or in connection with a gauze bandage in the production of a plaster cast. Thus, with steam calcined alpha calcium sulfate hemihydrate, optimum (maximum) mechanical strength properties in plaster casts and in pure gypsum bodies generally occurs at approximately the same particle size, and can occur, for example, at particle sizes between 9.1 and 10.5$\mu$. As the average particle size decreases below this optimum range, the mechanical properties of both plaster casts and pure gypsum bodies made from steam calcined alpha calcium sulfate hemihydrate steadily decreases. However, alpha hemihydrate which is hydrothermally produced exhibits in the plaster cast a continued increase in the resulting final rigidity when it is ground to below 7$\mu$. The same alpha hemihydrate behaves similar to the beta hemihydrates and those derived by steam treatment when in a pure plaster body, i.e., the hardness decreases in the pure plaster body when the plaster is further ground below an optimum average grain size. The improvement of mechanical properties of a plaster cast prepared from a hydrothermally produced alpha calcium sulfate hemihydrate ground to less than 7$\mu$ is completely unexpected.

Thus, a primary object of the present invention is to provide a plaster of Paris which, when applied with bandages, forms a cast with relatively high mechanical strength and hardness. Another object is to provide a high strength alpha calcium sulfate hemihydrate which sets without producing a watery film on its surface.

A further object of the present invention to provide from a hydrothermal recrystallization crystals of alpha calcium sulfate hemihydrate which have grain sizes of at most 200$\mu$ in length, at most 50$\mu$ in width and with an axial ratio of 1:2. Additional objects are readily apparent from the description and examples which follow.

DETAILED DESCRIPTION OF THE PREFERRED EMBODIMENTS

As is well known in the art, alpha-calcium sulfate hemihydrate used to be produced exclusively by a steam calcination treatment of natural gypsum in autoclaves. Such a process is described, for example, in U.S. Pat. No. 2,383,254, and the previously memtioned U.S. Pat. No. 1,901,051. The steam treatment extends over several hours, usually about 5 to 7 hours. In the steam calcination process, one always uses natural gypsum. The prebroken gypsum rock (10 to 80 mm) is subjected to saturated steam in a pressure vessel at approximately 110°to 150°C. After relaxation and extraction of the resulting liquid, the resulting hemihydrate is dried at the same, higher or reduced temperature, however, not below 80°–90°C, in order to prevent the reformation of dihydrate. Upon removal of the steam and drying in heat, the alpha hemihydrate is ground. The treatment times depend on the temperature employed and on the raw rock.

Alpha hemihydrate produced in this manner has the shape of rods or pins of a length of 0.1mm to several mm and a thickness of about 1/30 of the length. The fill quantities of such a hemihydrate lie — according to D.I.N. 1168 — between 220 and 280 g/100 g water (fill quantity indicates the maximum quantity of hemihydrate which can be used during the processing of hemihydrate into structural or molded parts per 100 g water). These fill quantities are low compared to a hemihydrate produced according to a hydrothermal process. Consequently, the molded parts produced from steam calcined alpha calcium sulfate hemihydrate are more porous and thus of poorer quality regarding their mechanical properties.

In contrast to the production of steam calcined alpha calcium sulfate hemihydrate, the hydrothermal conversion of calcium sulfate dihydrate to calcium sulfate hemidyrate occurs by the recrystallization of the dihydrate in a liquid water medium, and usually in the presence of substances which influence crystallization and promote the formation of alpha calcium sulfate hemihydrate crystals. In one type of hydrothermal conversion process, alpha hemihydrated gypsum is prepared by the treatment of crushed gypsum rock in a liquid aqueous suspension in autoclaves, preferably in the presence of crystal structure influencing substances, such as salts of aliphatic polycarboxylic acids or surface-active substances. From this kind of alpha hemihydrated gypsum, plaster casts can be made with compressive strengths in excess of 200kg./cm.$^2$.

In a second type of hydrothermal conversion process, alpha hemihydrated gypsum is prepared in salt solutions of appropriate concentration, as for example, in a liquid aqueous solution of 29% $CaCl_2$ and 1% $KCl$, at temperatures below the boiling point at atmospheric pressure. Here again, further improvements in quality are achieved by the addition of substances to influence crystallization, such as sulfite waste liquor or surface active substances. In this manner, alpha hemihydrated gypsum are produced directly from crushed gypsum rock with compressive strengths of about 600 kg./cm.$^2$. In both of these hydrothermal conversion processes, as in all such processes, the hemihydrate is obtained by recrystallization of the dihydrate from an aqueous liquid medium in which the dihydrate is completely immersed.

Hydrothermal conversion processes can also be used to produce alpha calcium sulfate hemihydrate from waste gypsum or synthetic gypsum, that is, gypsum obtained as a by-product of chemical processes, such as the "gypsum mud" produced as a by-product of the production of phosphoric acid by the wet process from crude phosphate and sulfuric acid, or the gypsum that is produced by the reaction of calcium carbonate with sulfuric acid.

To produce high quality alpha calcium sulfate hemihydrate from waste gypsum, the procedure set forth in the above-mentioned U.S. Pat. No. 3,337,298, which patent is hereby incorporated by reference, should be followed. Generally, high quality hemihydrated gypsums can be produced from the above-described synthetic gypsums, especially from the gypsum mud produced in the wet process of manufacture of phosphoric acid, by treatment of the calcium sulfate dihydrate in an aqueous liquid phase, at pH between about 1 and 5, preferably between about 2 and 4, according to the conditions of the reaction, and utilizing a continuous or quasi-continuous, portion-wise feeding of the calcium sulfate dihydrate to the aqueous liquid phase. The aqueous liquid phase to which the calcium sulfate dihydrate is added must contain alpha calcium sulfate hemihydrate seed crystals, and the process is performed in the presence of crystallization agents which are substances that influence the crystal structure and/or the speed of crystallization. The alpha calcium sulfate hemihydrate seed crystals can first be prepared in situ in the aqueous medium from waste gypsum by a discontinuous treatment of a batch of synthetic gypsum with liquid water in an autoclave at 105°–140° C, preferably at 115° to 120°C, or in salt solution at a temperature below the boiling point of this solution. When preparing the seed crystals in situ, the pH preferably is between 1 and 5, most preferably between 2 and 4, and substances should be present which influence crystal structure and crystallization speed such as alkylaryl sulfonate, for example.

The process for hydrothermally producing high quality hemihydrate from waste gypsum can be performed in the autoclave, in which case an aqueous suspension of the dihydrated calcium sulfate with appropriate crystallization agents added to influence crystal structure and/or the speed of crystallization is treated at temperatures between 105° and 140°C, preferably at 115° to 120°C, and it can also be performed without pressure by using salt solutions of appropriate concentration, also in the presence of substances which influence crystal structure and/or crystallization speed, as a reaction medium for the transformation to hemihydrated gypsum, keeping the temperature very close to the boiling point of the solution, e.g., in the range of 90°–110°C.

Thus, generally speaking, the starting product in hydrothermal conversion processes can be natural gypsum or waste gypsum. The recrystallization may take place under pressure or at atmospheric pressure. The only important thing is that the temperature of the dihydrate suspension lies above 90°C, preferably above 100°C, and the suspension preferably contains further susbstances which promote the growth of alpha calcium sulfate hemihydrate crystals. Such substances (crystallization agents) are, for example, alkylaryl sulfonate, salts of aliphatic polycarboxylic acids, and sulfite waste liquor. They are added only in small quantities, e.g., 0.5%. The crystallizating agents do not influence an already formed alpha hemihydrate, and are useful only when the conversion of dihydrate to hemihydrate takes place in their presence. In contrast to the steam calcination, the hydrothermal conversation takes place very rapidly, so to speak momentarily.

The resulting hemihydrate crystals produced by hydrothermal conversion processes are distinghuished from those produced by steam calcination in a number of important respects. Thus, the hydrothermally produced hemihydrate crystals are sturdy and compact and their length does not exceed the thickness by much (axial ratio 1:2 to 1:5). The fill quantities of hydrothermally produced hemihydrate [determined according to D.I.N. 1168], due to the compact crystal shape, i.e., with an axial ratio of 1:2 to 1:5, lie between 300 and 380 g/100 g water. Thus, the fill quantities of hydrothermally produced alpha calcium sulfate hemihydrate are up to 72% higher than with steam calcinated gypsum, which is evidenced inter alia in increased stabilities of pure gypsum bodies produced therefrom. Thus, substantial differences exist between hydrothermally produced and calcinated alpha hemihydrate.

In accordance with the invention, the hydrothermally produced alpha calcium sulfate hemihydrate is ground to a fine particle size having an average grain size of less than $7\mu$ and preferably less than $5\mu$. High quality hydrothermally produced alpha calcium sulfate hemihydrate has an average grain size of more than $7\mu$ and, for example, the average grain size can be from about $8\mu$ to about $16\mu$. This unground hydrothermally produced hemihydrate when used in a plaster cast can produce hardness values of about 75 to 81 kp in a dry state, which values are lower than that obtained from beta calcium sulfate hemihydrate. Grinding of the unground hydrothermally produced alpha hemihydrate from an average grain size of more than $7\mu$ to an average grain size of less than $7\mu$ substantially improves the hardness values obtained in dry plaster casts. Ball mills, impact pulverizers or pin disk mills are particularly well suited for the extremely fine (dry or wet) grinding. The alpha calcium sulfate hemihydrate may thus be pulverzied in the dry state or in suspension in an organic liquid medium, e.g. a solvent, such as methanol, ethanol, methylene chloride, propanol, isopropanol, methyl ethyl ketone and others with or without other additives, e.g. cellulose methyl ether, cellulose ethyl ether, methylene glycol, ethylene glycol and others.

The extremely fine grinding of the hydrothermally produced alpha hemihydrate results in hardnesses in dry plaster casts prepared from bandage material and the ground hemihydrate which are more than 25% higher than those from otherwise identical unground hydrothermally produced alpha hemihydrate. The hardness values of these dry casts, produced from the ground hydrothermally produced alpha hemihydrate, in accordance with the present invention, can range from about 100 kp and up, and usually from about 104 kp to about 114 kp. These values represent a significant improvement over hardness values obtained from beta calcium sulfate hemihydrate which are about 85 to 90 in the dry state and over both unground hydrothermally produced and steam calcined produced alpha calcium sulfate hemihydrate where the hardness values in the dry state can range from about 76 to 81 kp. The initial hardness of the cast in the wet state, when employing the extremely finely ground hydrothermally produced alpha calcium sulfate hemihydrate of the present invention, is at least 50% higher than presently realized hardness values. Thus a cast of equal hardness can be produced with substantially less binder, which is a material benefit to a patient. The high initial hardness in the wet state and the extremely fine grinding (which reduces the setting time of the hydrothermally produced alpha calcium sulfate hemihydrate) permit the applied cast to be subjected to stresses much sooner than similar casts prepared from previously employed beta calcium sulfate hemihydrate. The extremely fine grinding also eliminates the appearance of a watery film as it previously occurred with alpha calcium sulfate hemihydrate, and the plaster paste assumes a creamy state which is best for its application and molding characteristics. The application of alpha calcium sulfate hemihydrate according to the present invention for the production of bandages thus also constitutes a considerable technical advance in medical practice.

A preferred alpha calcium sulfate hemihydrate to be fineground according to the present invention has an initial grain size of at most 200 microns in length, at most 50 microns in width, and an axial ratio of from 1:2 to 1:5. The use of this preferred alpha calcium sulfate hemihydrate produces dry casts having optimum mechanical strength, hardness and stability properties.

The examples which follow are merely illustrative embodiments and in no way limit the scope of the invention.

EXAMPLE 1

An alpha-calcium sulfate hemihydrate of an average grain size of $8\mu$ and an axial crystal ratio of from 1:2 to 1:5 is produced according to German Published Patent Application No. 1,157,128, Example 1, by the following procedure where 2800 g of moist waste gypsum from the productin of phosphoric acid and having a moisture content of 28.5% were mixed with 2800 cm$^3$ hot water. The mixture is adjusted to a pH of 3.5 with calcium oxide, filtered and washed with further 2800 cm$^3$ water. Upon completion of the filtration, the dihydrate is dried at 45°–50°C, resulting in 2000 g calcium sulfate dihydrate.

400 g of the resulting calcium sulfate dihydrate are mixed with 600 cm$^3$ of a solution containing 29% calcium chloride and 1% potassium chloride. After the addition of 1 g sulfite waste liquor the mixture is heated in a stirring vessel to 105°–107°C. The conversion from dihydrate to alpha hemihydrate takes place after 1½ to 2 hours. Very small alpha hemihydrate crystals result which are approximately 2 to 3 times as long as they are wide. The compressive strengh of these small crystals lies at a maximum of 80–100 kp/cm$^2$.

To this hemihydrate suspension, there is added every 5 minutes, 100 g of calcium sulfate dihydrate waste gypsum, which has been treated and dried as described above and mixed in 150 cm$^3$ of the above-mentioned calcium chloride-potassium chloride solution. The conversion of the added calcium sulfate dihydrate to calcium sulfate hemihydrate then takes place very rapidly, i.e. in 1 to 2 minutes. After the addition of a total of 1600 g calcium sulfate dihydrate the resulting calcium sulfate hemihydrate suspension is filtered at 90°–100° C and is washed well in hot water. The average grain size of the resulting alpha calcium sulfate hemihydrate lies at $8\mu$ and the axial ratio of the crystals lies between 1:2 and 1:5.

The $8\mu$ average grain size hemihydrate is subsequently comminuted in a pinned disk mill to an average grain size of $4\mu$ in accordance with the teachings of the present invention.

A pure gypsum plaster body prepared from the initial gypsum (that is, the unground $8\mu$ average grain size gypsum) has a bending strength of 97 kp/cm$^2$ and a compressive strength of 350 kp/cm$^2$ with a water-gypsum factor of 0.5 determined according to D.I.N. [German Industrial Standard] 1168. In a plaster cast produced from gauze and the 8μ average grain size alpha calcium sulfate hemihydrate, however, a breaking strength of 81 kp is achieved after complete drying whereas a test in damp state, one hour after setting, resulted in a hardness of 27 kp.

The mechanical values of a pure gypsum plaster body produced from the 4μ ground gypsum are substantially lower than the 8μ gypsum at an identical water-gypsum factor, showing a bending strength of 93 kp/cm$^2$ and a compressive strength of 290 kp/cm$^2$. In spite of this, the finely ground alpha-calcium sulfate hemihydrate achieves a breaking strength in a plaster cast of 114 kp after completely drying and, when measured in a damp state 1 hour after setting, a hardness of 48 kp. Thus, under identical test conditons, the mechanical hardness of a plaster cast employing gypsum comminuted to 4μ is approximately 75% above the value for a plaster cast made from the uncomminuted gypsum when both casts are in the damp state, and more than 40% higher when both casts are in the dry state. In comparison with values realized with beta-calcium sulfate hemihydrate gypsum (alabaster) which reach a breaking strength of 85 to 90 kp in the dry state and whose hardness in a damp state 1 hour after setting lies between 29 and 32 kp, there is also a marked improvement.

EXAMPLE 2

An alpha-hemihydrate is produced according to the hydrothermal process described in German Published Patent Application No. 1,157,128, Example 2, by the following procedure in which 200 kg of moist waste gypsum having a pH of 1.0, and resulting from the production of phosphoric acid from Moroccan raw phosphate, are mixed with equal parts of water in a stirring vessel. The mixture is set to a pH of 3.5 with slaked lime. The suspension is then centrifuged, resulting in moist dihydrate. 20kg thereof (with the moisture content upon leaving the centrifuge) are mixed with 20 liters of a 0.2 percent alkyl aryl sulfonate solution. In a 170 liter autoclave the mixture is heated to 116°C and the dihydrate is recrystallized into alpha hemihydrate. After the reerystallization of the dihydrate into alpha hemihydrate, which occurs 20–30 minutes after reaching the maximum temperature of 116°C, 5 kg of the centrifuge moist gypsum mixed with 5 liters of 0.2% alkyl aryl sulfonate solution are added every 15 minutes.

The conversion into alpha calcium sulfate hemihydrate now occurs very rapidly and after the addition of further 20 kg centrifuge moist gypsum a significant increase in the size of the hemihydrate crystals can be noted.

When all the waste gypsum has been added, the resulting alpha calcium sulfate hemihydrate is removed from the autoclave and is washed with water of 80°–90°C. The alpha calcium sulfate hemihydrate is then dried at 90°C. The alpha hemihydrate crystals so produced had an average grain size of 16μ, a maximum length of 200μ, and a maximum width of 50μ. The mechanical properties of a pure plaster body produced from the 16μ average grain size gypsum, determined according to DIN 1168, at a water-gypsum factor of 1, are 23 kp/cm$^2$ tensile strength and 64 kp/cm$^2$ compressive strength The 16μ average grain size gypsum was then comminuted in a ball mall to produce gypsum particles of lower avergae grain size. Eight batches of lower average grain size gypsum particles were produced, with each batch having a successively lower average grain size. Pure plaster bodies were made from each batch and the mechanical values of these pure plaster bodies were determined according to DIN 1168. As can be seen in the following Table 1, the mechanical values of the pure plaster bodies initially increased as the average grain size of the particles used to form the bodies decreased. However, as the average grain size continued to decreased beyond a certain range, the mechanical values of the pure plaster bodies no longer increased, but instead started to decrease. A water gypsum factor of 1 was used in these Table 1 tests.

TABLE 1

| Average Grain Size in μ | Bending strength in kp/cm$^2$ | Compressive strength in kp/cm$^2$ |
|---|---|---|
| 16 (basic material) | 23 | 64 |
| 13.5 | 26 | 78 |
| 12.5 | 34 | 84 |
| 10.8 | 40 | 94 |
| 9.5 | 47 | 92 |
| 9 | 39 | 92 |
| 7.4 | 36 | 88 |
| 4.4 | 30 | 86 |
| 3.6 | 29 | 85 |

The maximum hardness in the pure gypsum test piece tested according to DIN 1168 lies between an average grain size of 9.5μ and 10.8μ. In a plaster cast, however, the following results set forth in Table 2, are achieved under identical conditions:

TABLE 2

| Average grain size in μ | breaking strength in kp damp | dry |
|---|---|---|
| 13.5 | 34 | 76 |
| 9.5 | 36 | 83 |
| 3.6 | 42 | 104 |

Table 2 shows that with increasing extremely fine grinding an increase of the hardness values occurs in the plaster cast. If, however, an alpha calcium sulfate hemihydrate is produced in an autoclave with steam treatment, i.e., not hydrothermally via the solution phase, from natural gypsum rock by topochemical conversion of calcium sulfate dihydrate, this alpha calcium sulfate hemihydrate, after the convertional grinding of the gypsum rock chunks and after conversion, has in a pure plaster body the mechanical characteristics according to D.I.N. 1168 of 82 kp/cm$^2$ bending strength and 256 kp/cm$^2$ compressive strength at a water-gypsum factor of 0.5. The average grain size in this plaster is 7.6μ. After a further extremely fine grinding in a pinned disk mill, the resulting alpha calcium sulfate hemihydrate has an average grain size of 3.5μ, a bending strength of 75 kp/cm$^2$ and a compressive strength of 246 kp/cm$^2$. Plaster casts produced therefrom furnish, with an average grain size of 7.6μ, a breaking strength in dry state of 68 kp and of 26.5 kp in damp state 1 hour after setting. After extremely fine grinding to a 3.5μ average grain size, these values lie at 78.5 kp breaking strength in dry state and 29 kp in damp state and are thus only slightly above the values of the basic gypsum. Thus the beta-hemihydrate hardnesses are only barely reached.

An even better indication of the improvement obtained by the present invention as compared to steam calcinated alpha-calcium sulfate hemihydrate is demonstrated by the following data for steam calcinated alpha-calcium sulfate hemihydrate where a water-gypsum factor of 1 is used which is the same water-gypsum factor used for the hydrothermally produced alpha-calcium sulfate hemihydrate of this example.

The steam calcinated alpha hemihydrate is produced by steam treatment of natural gypsum with a particle size of about 11 mm at 140°C in autoclaves over a period of 5 hours, and the mechanical values after grinding of the resulting alpha hemihydrate for pure plaster bodies produced at a water-gypsum factor of 1 are as follows:

| Average grain size in $\mu$ | Tensile strength | Compressive strength $kp/cm^2$ |
|---|---|---|
| 15 | 17 | 47 |
| 12 | 24 | 60 |
| 10 | 27 | 65 |
| 7 | 20 | 63 |
| 3.5 | 10 | 50 |

In a plaster cast of guaze and the same steam calcinated alpha-calcium sulfate hemihydrate at a water-gypsum factor of 1 the values are as follows:

| Average grain size in $\mu$ | Breaking strengths in kp | |
|---|---|---|
| | wet | dry |
| 15 | 26 | 68 |
| 10 | 29 | 78.5 |
| 7 | 22 | 65.5 |
| 3.5 | 18 | 55 |

It will be understood that the above description of the present invention is susceptible to various modifications, changes and adaptations, and the same are intended to be comprehended within the meaning and range of equivalents of the appended claims.

We claim:

1. In a plaster bandage having a bandage and calcium sulfate hemihydrate as the plaster, the improvement wherein the calcium sulfate hemihydrate is fine particle size hydrothermally produced alpha calcium sulfate hemihydrate having an average grain size below 7 microns which average grain size is lower than the average size which provides optimum mechanical properties in a pure gypsum body cast from the said alpha calcium sulfate hemihydrate.

2. A plaster bandage according to claim 1 wherein the average grain size is below 5 microns.

3. A plaster bandage according to claim 1 wherein the fine particle size alpha calcium sulfate hemihydrate is ground from alpha-calcium sulfate hemihydrate having a grain size of at most 200 microns in length, at most 50 microns in width and an axial ratio of from 1:2 to 1:5.

4. The plaster bandage according to claim 1 wherein the bandage is a gauze bandage.

5. The plaster bandage according to claim 1 wherein the fine particle size is obtained by grinding a hydrothermally produced alpha calcium sulfate hemihydrate having an average grain size higher than 7 microns to an average grain size less than 7 microns.

6. The plaster bandage according to claim 5 wherein the fine particle size alpha calcium sulfate hemihydrate is ground from alpha calcium sulfate hemihydrate having a grain size of at most 200 microns in length, at most 50 microns in width and an axial ratio of from 1:2 to 1:5.

7. The plaster bandage according to claim 5 wherein the plaster bandage produces a plaster cast having a hardness in the dry state of at least 100kp.

8. The plaster bandage according to claim 5 wherein the plaster bandage produces a plaster cast having a hardness in the dry state of about 104 to 114kp.

9. The plaster bandage according to claim 5 wherein the average grain size of the ground hemihydrate is less than 5 microns.

10. The plaster bandage according to claim 5 wherein the bandage is a gauze bandage.

11. The plaster bandage according to claim 1 wherein the plaster bandage produces a plaster cast having a hardness in the dry state of at least 100kp.

12. The plaster bandage according to clain 1 wherein the plaster bandage produces a plaster cast having a hardness in the dry state of about 104 to 114kp.

13. The plaster bandage according to claim 1 wherein the average grain size is at least 0.5 microns.

14. The plaster bandage according to claim 1 wherein the hydrothermal production of the calcium sulfate hemihydrate is by recrystallization of calcium sulfate dihydrate from an aqueous liquid medium in which the dihydrate is completely immersed.

* * * * *